(12) United States Patent
Nakamoto et al.

(10) Patent No.: US 10,381,845 B2
(45) Date of Patent: Aug. 13, 2019

(54) POWER STORAGE APPARATUS, METHOD FOR CONTROLLING POWER STORAGE APPARATUS, AND VEHICLE

(71) Applicant: GS Yuasa International Ltd., Kyoto-shi (JP)

(72) Inventors: Takeshi Nakamoto, Kyoto (JP); Daisuke Konishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 91 days.

(21) Appl. No.: 15/660,644

(22) Filed: Jul. 26, 2017

(65) Prior Publication Data

US 2018/0041052 A1  Feb. 8, 2018

(30) Foreign Application Priority Data

Aug. 5, 2016  (JP) .................. 2016-154943

(51) Int. Cl.
*H02J 7/00*  (2006.01)
*H02J 7/14*  (2006.01)

(52) U.S. Cl.
CPC .......... *H02J 7/0026* (2013.01); *H02J 7/0016* (2013.01); *H02J 7/0068* (2013.01); *H02J 7/0077* (2013.01); *H02J 7/1461* (2013.01); *H02J 7/1492* (2013.01); *Y02T 10/7005* (2013.01); *Y02T 10/92* (2013.01)

(58) Field of Classification Search
CPC .. H02J 7/00; H02J 7/007; H02J 7/0026; H02J 7/0019; H02J 7/0029; H02J 7/0068; B60L 11/187; B60L 11/1866; B60L 11/14; B60L 11/1859; H01M 10/44; H01M 10/48; H01M 10/486

USPC .............. 307/9.1, 10.1, 10.2, 43, 38, 64, 66; 320/108, 109, 128, 110, 129
See application file for complete search history.

(56) References Cited

U.S. PATENT DOCUMENTS

| | | | |
|---|---|---|---|
| 6,205,036 B1 * | 3/2001 | Anzawa | H02J 7/0018 363/20 |
| 7,221,064 B2 * | 5/2007 | Okuda | F02N 11/0866 307/10.1 |
| 2013/0229186 A1 * | 9/2013 | Shiraishi | G01R 31/327 324/415 |
| 2013/0249496 A1 | 9/2013 | Ju et al. | |
| 2014/0225622 A1 * | 8/2014 | Kudo | B60L 3/0046 324/433 |
| 2016/0276849 A1 * | 9/2016 | Hamada | H02J 7/0019 |
| 2017/0225636 A1 * | 8/2017 | Tanigawa | B60Q 9/00 |
| 2017/0232851 A1 * | 8/2017 | Unno | B60L 50/51 307/10.1 |

(Continued)

FOREIGN PATENT DOCUMENTS

JP  2013-201888 A  10/2013
JP  2014-166020 A  9/2014

*Primary Examiner* — Fritz M Fleming
*Assistant Examiner* — Jagdeep S Dhillon
(74) *Attorney, Agent, or Firm* — McGinn I.P. Law Group, PLLC.

(57) ABSTRACT

A power storage apparatus includes a plurality of power storage devices, a switch provided on a current-carrying path to the plurality of power storage devices, a voltage detecting unit that detects respective voltages of the power storage devices, and a control unit. The control unit switches a duty ratio of the switch so as to prevent or delay the voltages of the power storage devices from reaching an upper limit voltage during the charge.

20 Claims, 12 Drawing Sheets

(56) References Cited

U.S. PATENT DOCUMENTS

2017/0338668 A1* 11/2017 Sada .................... H01M 10/486
2018/0041054 A1* 2/2018 Nakamoto ............ B60R 16/033

* cited by examiner

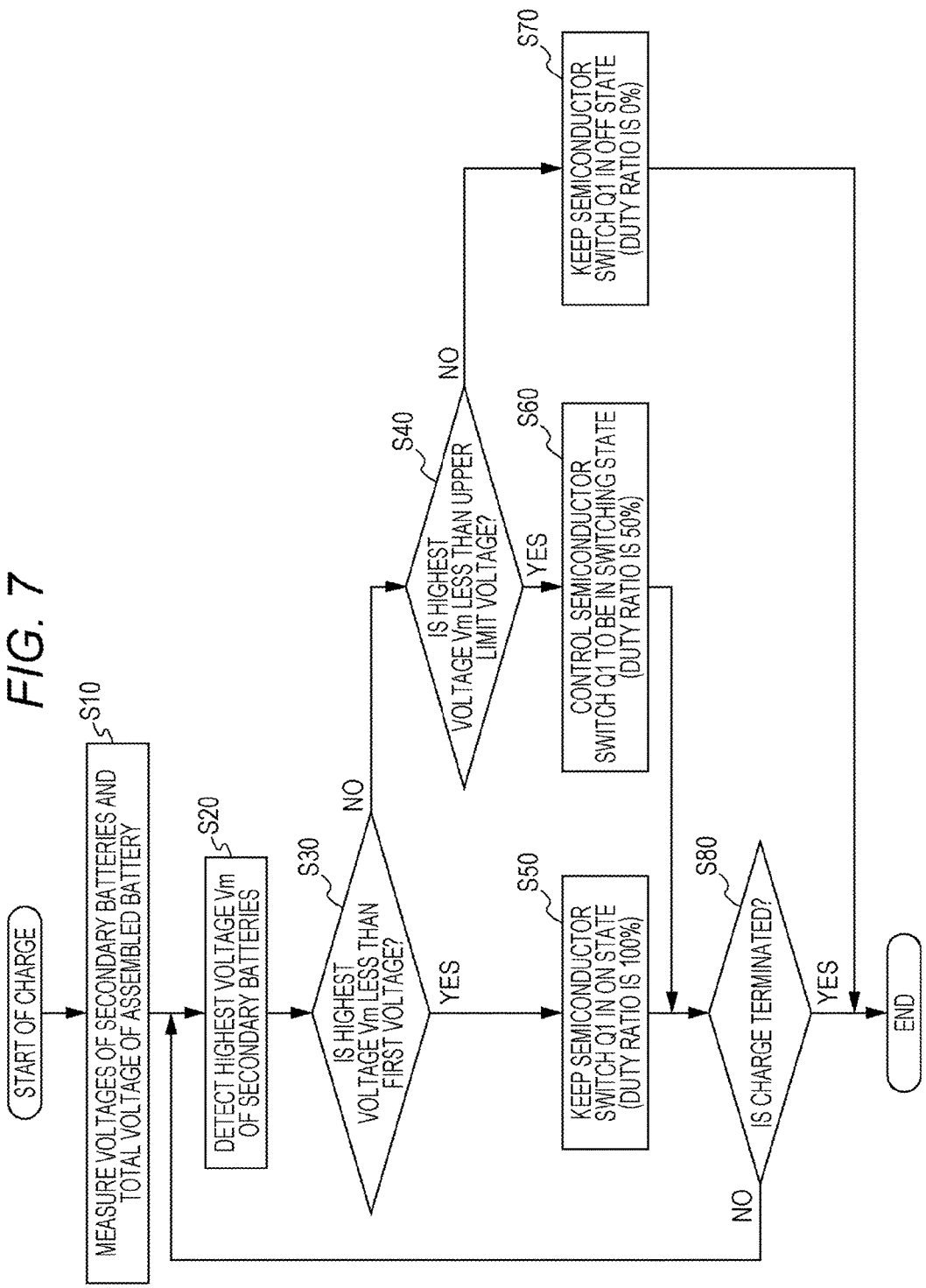

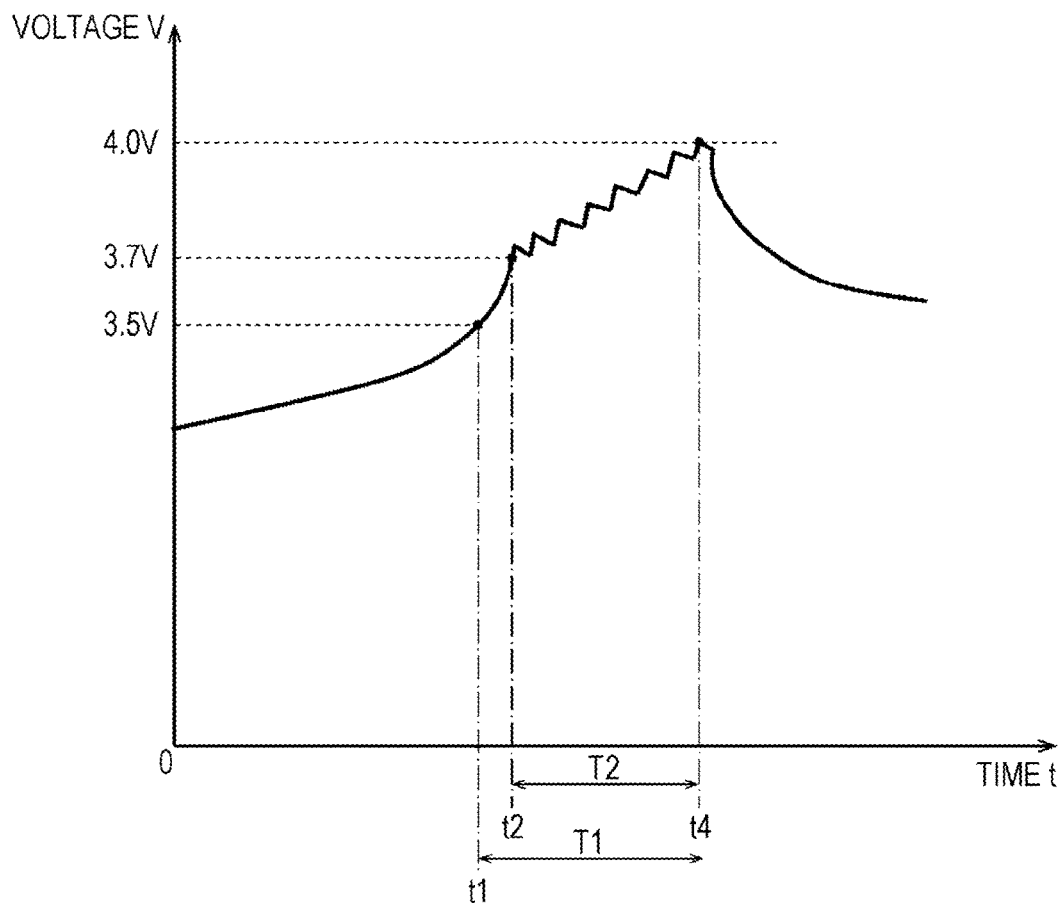

POWER STORAGE APPARATUS, METHOD FOR CONTROLLING POWER STORAGE APPARATUS, AND VEHICLE

CROSS-REFERENCE TO RELATED APPLICATIONS

This application is based on Japanese Patent Application No. 2016-154943 filed on Aug. 5, 2016, the entire contents of which are hereby incorporated by reference.

FIELD

The present invention relates to a power storage apparatus.

BACKGROUND

A power storage apparatus is equipped with switches, such as a relay and a semiconductor switching element, to enhance safety. The switch prevents a power storage device from falling into an overdischarge state or an overcharge state. Such a power storage apparatus is used, for example, as a power source for a vehicle, and is configured to be charged by an alternator of the vehicle. JP 2014-166020 A describes that a voltage generated by an alternator is stepped down by a voltage converter to supply electric power to a load such as a power storage apparatus.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Power storage devices constituting an assembled battery vary in voltage. The power storage devices are preferably prevented from being overcharged. An alternator or charger mounted on a vehicle may not acquire information of power storage devices from a power storage apparatus. The alternator or charger mounted on the vehicle may be an inexpensive one and may not have a charge control function. Accordingly, a power storage apparatus is required to have a function of adjusting the charge current, thereby preventing or delaying the overvoltage of power storage devices constituting an assembled battery regardless of the performance of an alternator or the like. The power storage apparatus is required to prevent or delay the over voltage of power storage devices even if an alternator or the like mounted on a vehicle does not acquire information of the power storage devices from the power storage apparatus.

An object of the present invention is to adjust a charge current inside a power storage apparatus, thereby preventing or delaying the overvoltage of the power storage apparatus.

A power storage apparatus disclosed in the present application includes a plurality of power storage devices, a switch provided on a current-carrying path to the plurality of power storage devices, a voltage detecting unit that detects respective voltages of the power storage devices, and a control unit. The control unit switches a duty ratio of the switch so as to prevent or delay the voltages of the power storage devices from reaching an upper limit voltage during charge.

A method for controlling a power storage apparatus disclosed in the present application includes switching a duty ratio of a switch provided on a current-carrying path to a plurality of power storage devices included in the power storage apparatus so as to prevent or delay voltages of the power storage devices from reaching an upper limit voltage during charge.

BRIEF DESCRIPTION OF DRAWINGS

The foregoing and other features of the present invention will become apparent from the following description and drawings of an illustrative embodiment of the invention in which:

FIG. 7 is a flowchart of charge current control.

FIG. 8 is a graph showing a charge characteristic of the secondary battery.

FIG. 9 is a diagram showing a relationship between the highest voltage of the secondary battery and the duty ratio of a semiconductor switch in Embodiment 2.

DESCRIPTION OF EMBODIMENTS

Figure 1:
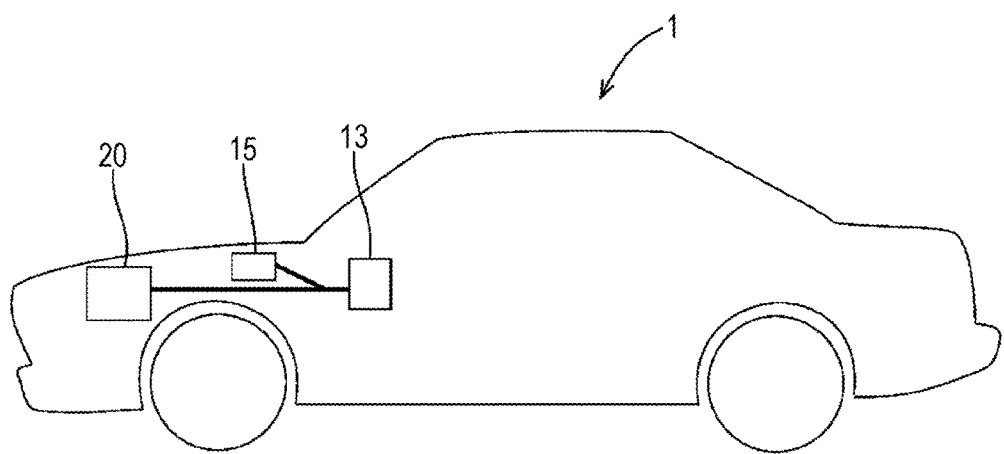
FIG. 1 is a side view of a vehicle applied in Embodiment 1.

A power storage apparatus disclosed in the present application includes a plurality of power storage devices, a switch provided on a current-carrying path to the plurality of power storage devices, a voltage detecting unit that detects respective voltages of the power storage devices, and a control unit. The control unit switches a duty ratio of the switch so as to prevent or delay the voltages of the power storage devices from reaching an upper limit voltage during charge.

A method for controlling a power storage apparatus disclosed in the present application includes switching a duty ratio of a switch provided on a current-carrying path to a plurality of power storage devices included in the power storage apparatus so as to prevent or delay voltages of the power storage devices from reaching an upper limit voltage during charge.

According to the power storage apparatus disclosed in the present application, the power storage apparatus can independently switch the charge current by switching the duty ratio. The power storage apparatus can prevent or delay the power storage devices from reaching an upper limit voltage regardless of the performance of an alternator or the like even if the alternator or the like mounted on a vehicle does not acquire information on the voltages of the respective power storage devices from the power storage apparatus.

First, general description of a power storage apparatus disclosed in present embodiments will be provided below.

The power storage apparatus includes a plurality of power storage devices, a switch provided on a current-carrying path to the plurality of power storage devices, a voltage detecting unit that detects respective voltages of the power storage devices, and a control unit. The control unit switches a duty ratio between on and off time of the switch so that the voltages of the power storage devices do not exceed an upper limit voltage. With this configuration, the power storage apparatus can independently switch the charge current by switching the duty ratio regardless of the performance of an alternator or the like. Even if the alternator or the like mounted on a vehicle does not acquire information on the voltages of the respective power storage devices from the power storage apparatus, the power storage apparatus can prevent the power storage devices from exceeding the upper limit voltage, or can delay the power storage devices from reaching the upper limit voltage.

According to an aspect of the power storage apparatus disclosed in the present embodiments, if the highest voltage of the power storage devices exceeds a threshold, the switch is controlled to be in a switching state where the switch is alternately turned on and off with a predetermined period. With this configuration, the switch is controlled to be in the switching state if the highest voltage of the power storage devices exceeds the threshold. Therefore, it is possible to suppress the subsequent voltage rise of all the power storage devices including the one having a high voltage.

Furthermore, according to another aspect of the power storage apparatus disclosed in the present embodiments, the control unit sets the duty ratio of the switch to be smaller as the highest voltage of the power storage devices is increased. With this configuration, the charge current is reduced as the highest voltage of the power storage devices is increased. Therefore, it is possible to further suppress the voltage rise of the power storage devices and to delay the power storage devices from reaching the upper limit voltage.

Moreover, according to still another aspect of the power storage apparatus disclosed in the present embodiments, the threshold is a numerical value between the upper limit voltage and a voltage obtained by dividing a target charge voltage, which is a target charge value of the total voltage of the power storage devices, by the number of the power storage devices. With this configuration, if the power storage devices are equal in voltage, the power storage devices can be charged up to the target charge voltage without the switching control. That is, the power storage devices can be charged without reducing the charge current, and therefore the charge speed is not reduced. When the highest voltage of the power storage devices exceeds the threshold, the switching control is performed. Accordingly, it is possible to suppress the subsequent voltage rise of the power storage devices and to prevent or delay the power storage devices from reaching the upper limit voltage.

Furthermore, according to still another aspect of the power storage apparatus disclosed in the present embodiments, the power storage apparatus includes a plurality of discharge circuits that are connected to the power storage devices in parallel and discharge the power storage devices. If the highest voltage of the power storage devices exceeds the threshold while the discharge circuits are in operation, the control unit controls the switch to be in the switching state in parallel with a voltage balancing process performed by the discharge circuits. With this configuration, it is possible to suppress the voltage rise of the power storage devices while balancing the voltages of the power storage devices.

Moreover, according to still another aspect of the power storage apparatus disclosed in the present embodiments, the power storage devices are iron-phosphate-based lithium-ion secondary batteries. Since an iron-phosphate-based lithium-ion secondary battery shows a sudden rise in OCV with the change in SOC at the end of charge, a particular secondary battery easily reaches an upper limit voltage. The voltage rise can be suppressed by applying the present technique to iron-phosphate-based lithium-ion secondary batteries, so that it is possible to prevent a particular lithium-ion secondary battery from reaching the upper limit voltage at the end of charge, or to delay a particular lithium-ion secondary battery from reaching the upper limit voltage.

Furthermore, according to still another aspect of the power storage apparatus disclosed in the present embodiments, the switch is an FET having a parasitic diode of which the forward direction is a discharge direction. With this configuration, by turning the FET off, the charge can be cut off, and the discharge can be continued.

Moreover, according to still another aspect of the power storage apparatus disclosed in the present embodiments, if the voltage between external terminals of the power storage apparatus exceeds a set voltage after the control unit turns the switch off, the control unit turns the switch on. With this configuration, the charge current flows by turning the switch on, so that it is possible to suppress the voltage rise of a vehicle generator.

Embodiment 1

Embodiment 1 of the present invention will be described with FIGS. 1 to 8.

1. Description of Battery

Figure 2:
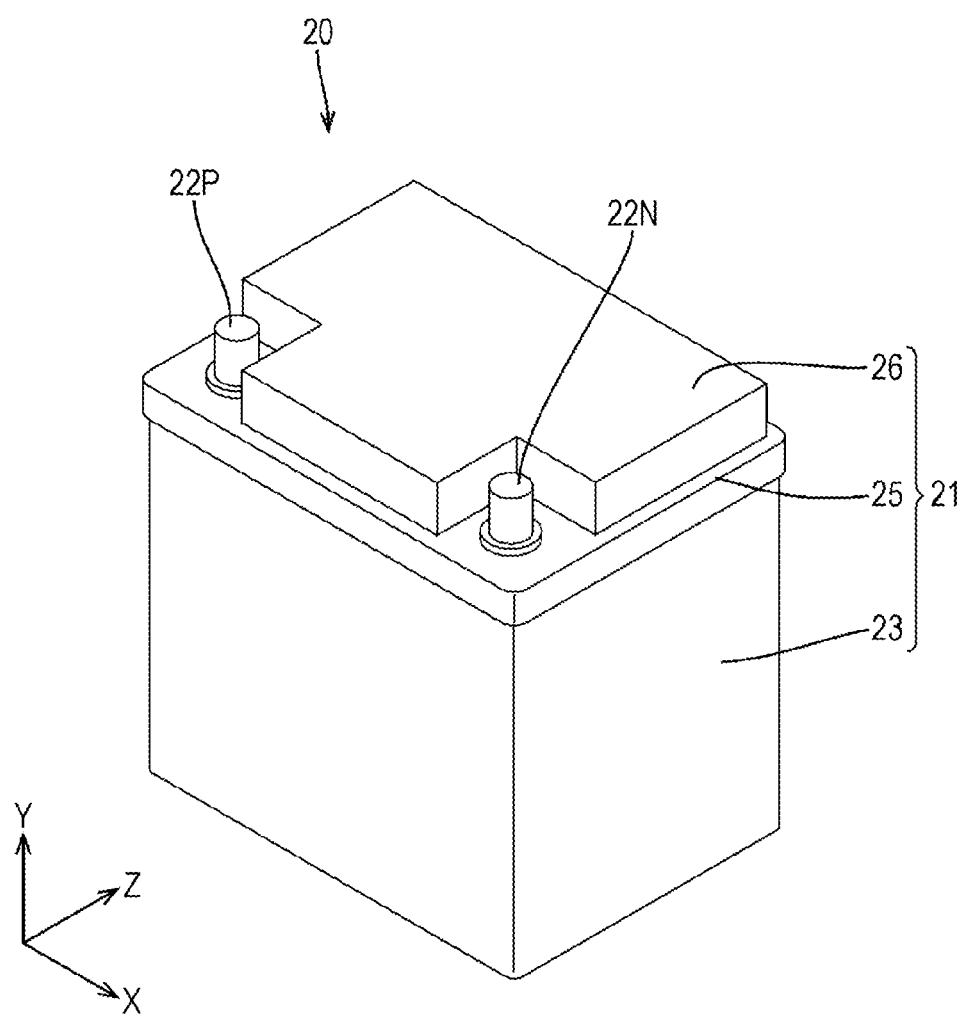
FIG. 2 is a perspective view of a battery.
Figure 3:
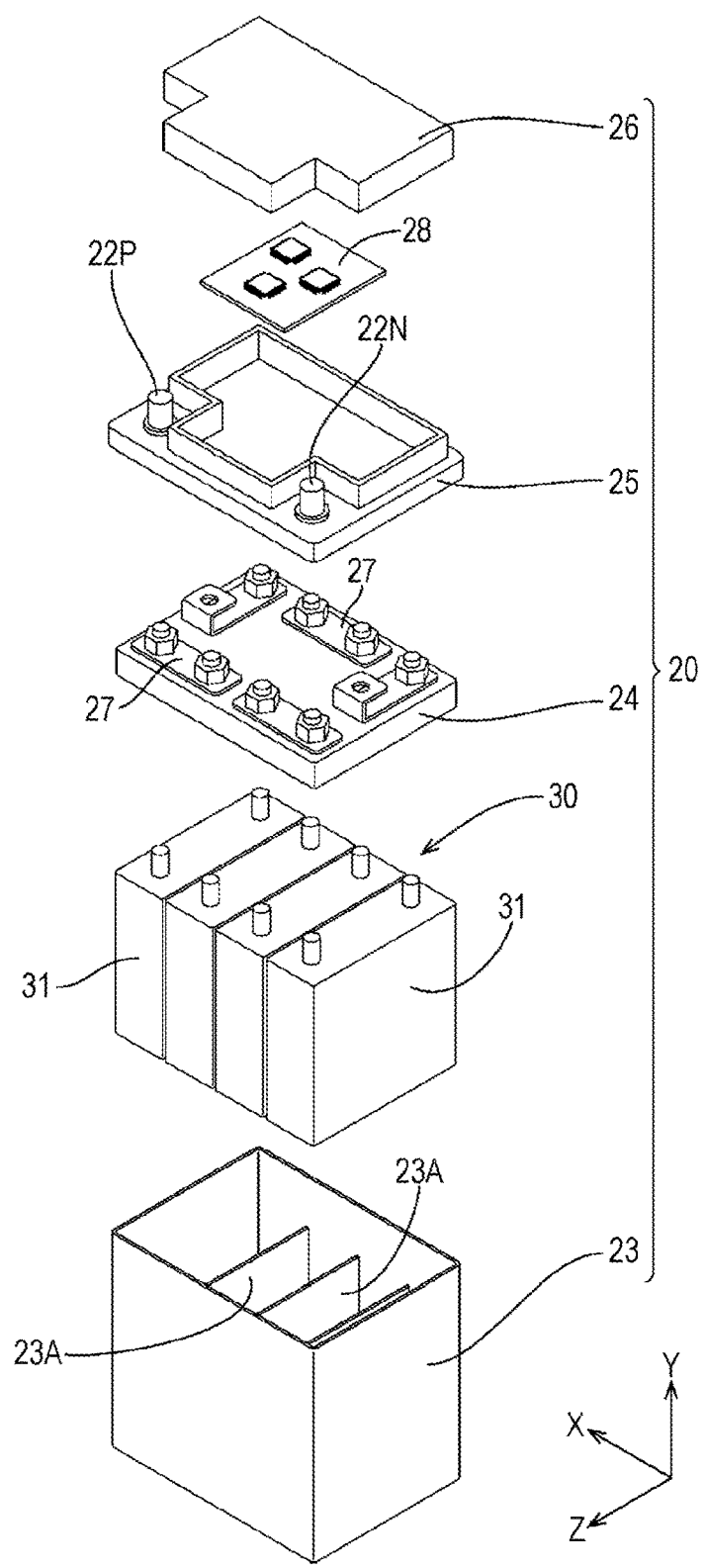
FIG. 3 is an exploded perspective view of the battery.

FIG. 1 is a side view of a vehicle; FIG. 2 is a perspective view of a battery; and FIG. 3 is an exploded perspective view of the battery.

As shown in FIG. 1, a vehicle 1 includes an electronic control device 13, an alternator 15, and a battery 20. Although not shown in FIG. 1, the vehicle 1 is provided with a vehicle load 10, such as an air conditioner and a headlamp, other than the electronic control device 13. The battery 20 corresponds to a "power storage apparatus", and the alternator 15 corresponds to a "vehicle generator".

The battery 20 supplies electric power to the vehicle load 10 including the electronic control device 13, and is connected to the alternator 15 controlled by the electronic control device 13. The alternator 15 includes an adjusting unit (not shown) that adjusts an output, and is subjected to feedback control so that an output voltage stays constant. Therefore, in this example, the battery 20 is charged with a constant voltage by the alternator 15. The alternator 15 is not limited to the example of the present embodiment, and may be, for example, a high-performance alternator having an output-voltage adjusting function or a pulse charge function. Furthermore, the alternator 15 may be a simple alternator that only generates electric power with the driving of a vehicle.

As shown in FIG. 2, the battery 20 has a block-shaped battery case 21. An assembled battery 30 composed of a plurality of secondary batteries 31, and a circuit board 28 are contained in the battery case 21. In the following description, with reference to FIGS. 2 and 3, the vertical direction of the battery case 21 when the battery case 21 is horizontally placed on a mounting surface without tilting will be referred to as a Y direction; the direction along the long side of the battery case 21 will be referred to as an X direction; and the depth direction of the battery case 21 will be referred to as a Z direction.

As shown in FIG. 3, the battery case 21 includes an open-top, box-shaped case body 23, a positioning member 24 for positioning the secondary batteries 31, an inner lid 25 attached on top of the case body 23, and a top lid 26 attached on top of the inner lid 25. As shown in FIG. 3, the case body 23 has a plurality of cell compartments 23A arranged in the X direction. The secondary batteries 31 are contained in the cell compartments 23A, respectively.

As shown in FIG. 3, a plurality of bus bars 27 are arranged on the top surface of the positioning member 24. By placing the positioning member 24 on top of the secondary batteries 31 arranged in the case body 23, the secondary batteries 31 are positioned, and are also connected in in series by the bus bars 27.

As shown in FIG. 2, the inner lid 25 has a substantially rectangular shape in a plan view and has an uneven shape with different heights in the Y direction. Both ends of the inner lid 25 in the X direction are provided with a pair of terminal parts 22P and 22N connected to harnesses (not shown), respectively. The terminal parts 22P and 22N are made of metal such as lead alloy. The terminal part 22P is a positive terminal, and the terminal part 22N is a negative terminal. It is noted that the positive terminal 22P and the negative terminal 22N are an example of "external terminals".

Furthermore, as shown in FIG. 3, the inner lid 25 can contain the circuit board 28. By attaching the inner lid 25 to the case body 23, the secondary batteries 31 are connected to the circuit board 28.

2. Electrical Configuration of Battery 20

Figure 4:
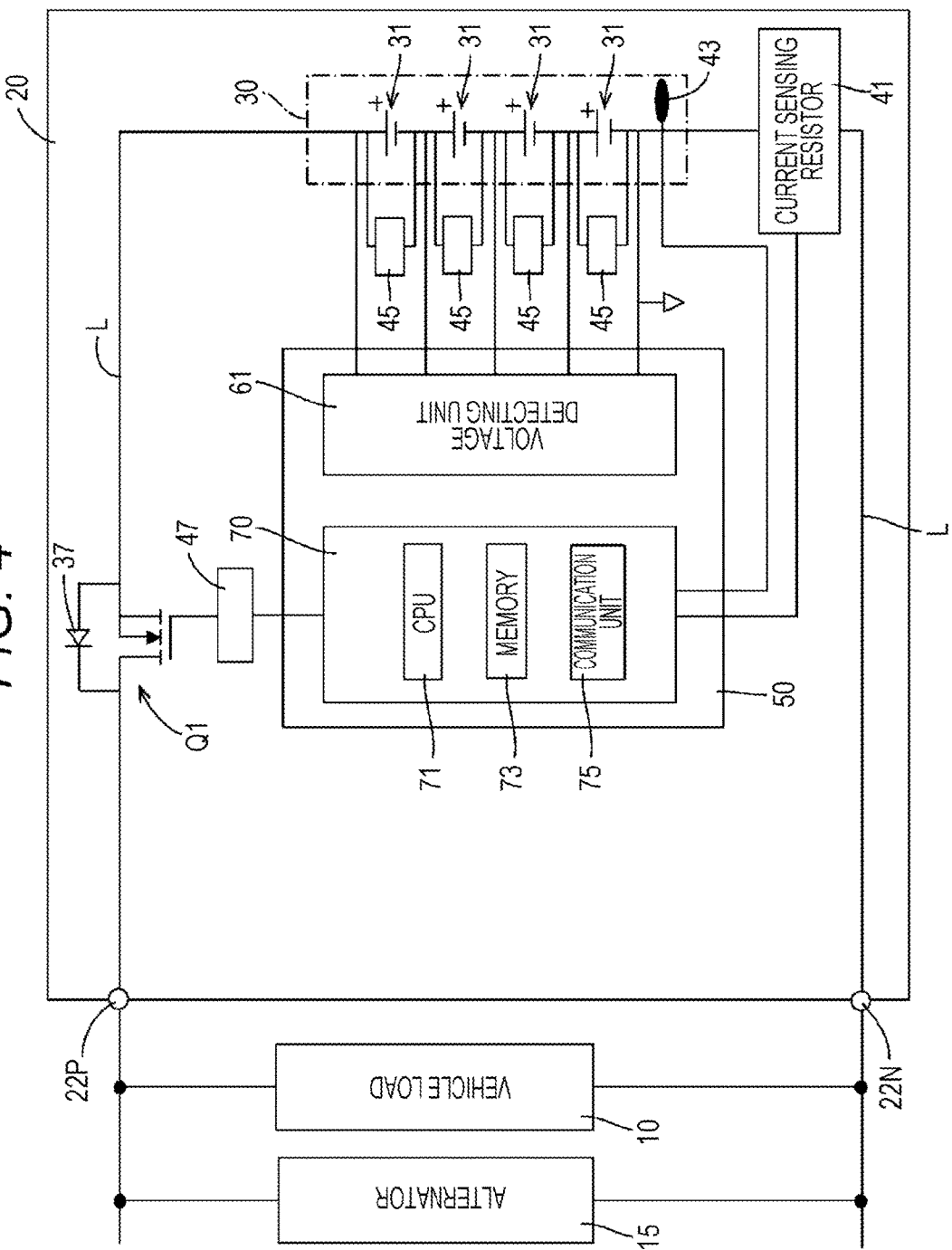
FIG. 4 is a circuit diagram of the battery.

FIG. 4 is a circuit diagram showing an electrical configuration of the battery 20. The vehicle load 10 and the alternator 15 are connected to the battery 20 through the positive terminal 22P and the negative terminal 22N that are external terminals. The battery 20 includes the assembled battery 30, a current sensing resistor 41, a temperature sensor 43, a semiconductor switch Q1, discharge circuits 45, and a management device 50 that manages the assembled battery 30.

The assembled battery 30, the current sensing resistor 41, and the semiconductor switch Q1 are connected in series through a current-carrying path L. In the present example, the current sensing resistor 41 is arranged on the negative electrode side, and the semiconductor switch Q1 is arranged on the positive electrode side.

The assembled battery 30 is composed of a plurality of (in the present example, four) lithium-ion secondary batteries 31 (an example of "power storage devices") connected in series. The secondary batteries 31 are, for example, iron-phosphate-based lithium-ion secondary batteries using lithium iron phosphate ($LiFePO_4$) as a positive electrode active material and carbon (graphite) as a negative electrode active material.

Figure 5:
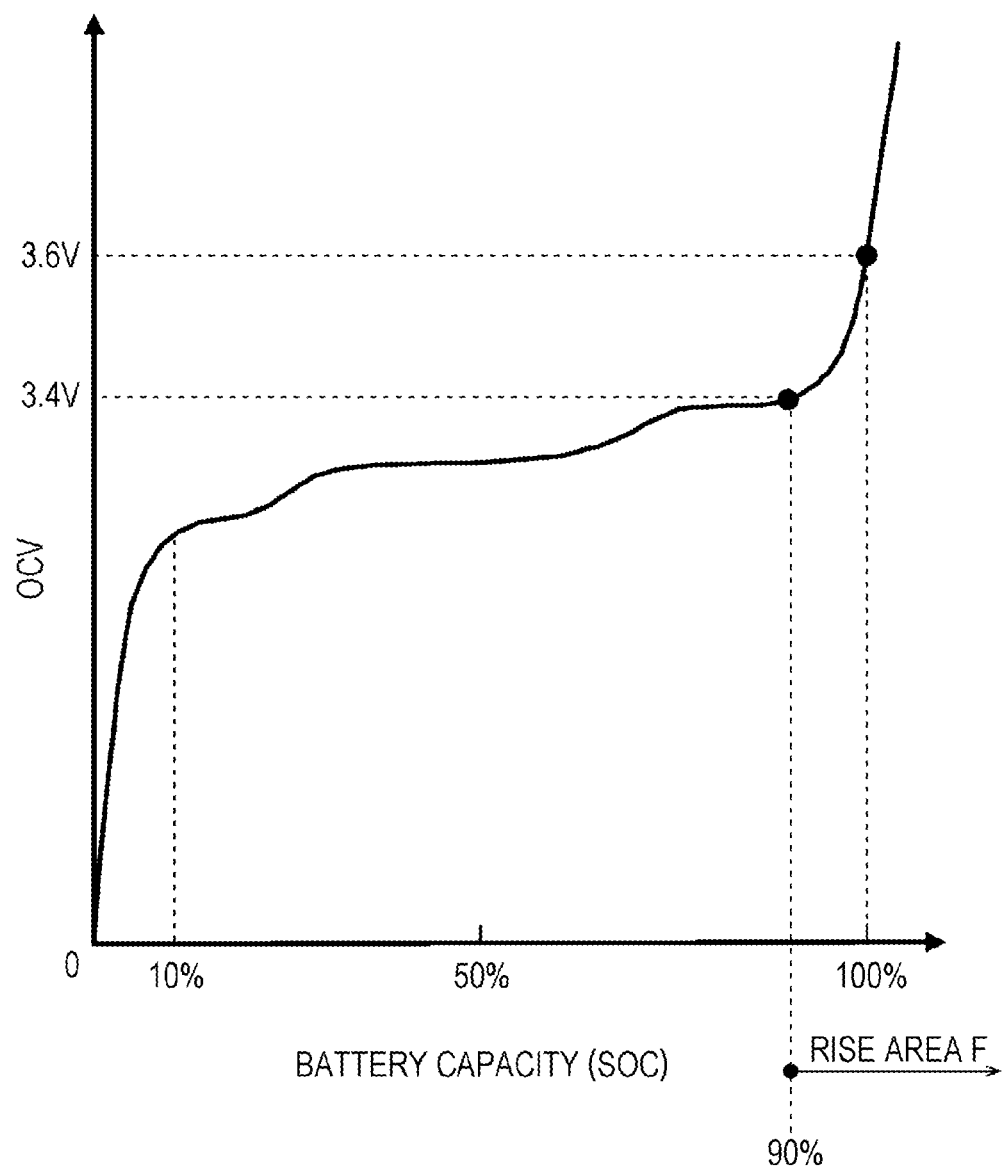
FIG. 5 is a graph showing an SOC-OCV characteristic of a secondary battery.

The "iron-phosphate-based" lithium-ion secondary batteries mean lithium-ion secondary batteries using lithium iron phosphate ($LiFePO_4$) as a positive electrode active material, and instead of carbon, lithium titanate or silicon can be used as a negative electrode active material. FIG. 5 shows an SOC-OCV correlation characteristic of the iron-phosphate-based lithium-ion secondary batteries 31.

As shown in FIG. 5, the iron-phosphate-based lithium-ion secondary batteries 31 have a low change area and a high change area. The low change area has a relatively low amount of OCV change with an amount of SOC change, and the high change area has a relatively high amount of OCV change with an amount of SOC change. Specifically, the beginning of charge (i.e., the end of discharge) when SOC is less than 10% is a high change area where OCV rapidly changes relative to an amount of SOC change. Furthermore, the end of charge when SOC is 90% or more (a rise area F shown in FIG. 5) is also a high change area where OCV rapidly changes relative to an amount of SOC change. The middle of charge (i.e., the middle of discharge) when SOC is 10% or more but less than 90% is a flat area (a plateau) where OCV is substantially constant relative to SOC. Incidentally, SOC stands for state of charge, and OCV stands for open circuit voltage.

The current sensing resistor 41 functions to detect the electric current flowing through the secondary batteries 31. The temperature sensor 43 is a contact or a non-contact type, and functions to measure the temperature [° C.] of the secondary batteries 31.

The current sensing resistor 41 and the temperature sensor 43 are electrically connected to the management device 50 by a signal line, and detection values of the current sensing resistor 41 and the temperature sensor 43 are configured to be retrieved by the management device 50.

The semiconductor switch Q1 is an N-channel field-effect transistor (FET). The drain of the semiconductor switch Q1 is connected to the positive terminal 22P, and the source is connected to the positive electrode of the assembled battery 30. A driver 47 is connected to the gate of the semiconductor switch Q1. The driver 47 is configured to receive a control signal from a control unit 70. In response to a command (a control signal) from the control unit 70, the semiconductor switch Q1 functions to open/close the current-carrying path L on the positive electrode side.

The semiconductor switch Q1 includes a parasitic diode 37. The forward direction of the parasitic diode 37 is a discharge direction of the assembled battery 30. When the semiconductor switch Q1 is controlled to be kept in an off state, the charge current applied to the assembled battery 30 is cut off, but the discharge current from the assembled battery 30 flows through the parasitic diode 37.

Figure 6:
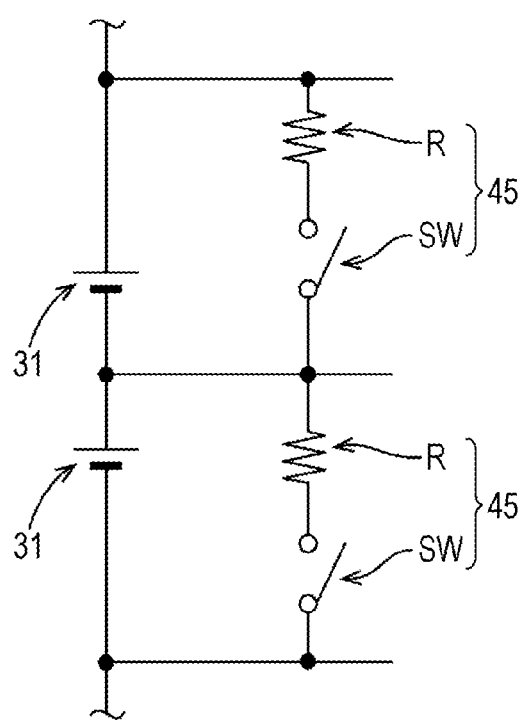
FIG. 6 is a circuit diagram of discharge circuits.

The discharge circuits 45 are provided in correspondence to the secondary batteries 31. As shown in FIG. 6, the discharge circuits 45 each include a discharge resistance R and a discharge switch SW, and are each connected in parallel to the corresponding secondary battery 31. Upon receipt of a command from the control unit 70, each discharge circuit 45 turns on the discharge switch SW, thereby individually discharging the corresponding secondary battery 31.

The management device 50 includes a voltage detecting unit 61 and the control unit 70. The voltage detecting unit 61 is connected to both ends of each secondary battery 31 through a detection line, and functions to measure the voltage of each secondary battery 31 and the total voltage of the assembled battery 30.

The control unit 70 includes a central processing unit (CPU) 71, a memory 73, and a communication unit 75. The CPU 71 monitors the electric current, voltage, and temperature of each secondary battery 31 from outputs of the current sensing resistor 41, the voltage detecting unit 61, and the temperature sensor 43. Furthermore, the control unit 70 performs a voltage balancing process and charge current control to be described later. The memory 73 stores data (for example, data of a first voltage, a second voltage, an upper limit voltage, etc.) necessary to perform the voltage balancing process and charge current control.

The memory 73 stores therein information for monitoring the battery 20. The memory 73 further stores therein data necessary to perform the later-described voltage balancing process and charge current control on the secondary batteries 31. The communication unit 75 communicates with the electronic control device 13 mounted on the vehicle 1.

The management device 50, the semiconductor switch Q1, the discharge circuits 45, and the current sensing resistor 41 are mounted on the circuit board 28, and provided inside the battery 20. The temperature sensor 43 is also provided inside the battery 20.

The control unit 70 can detect the charge from the alternator 15 on the basis of a detection value of the current sensing resistor 41. Specifically, the control unit 70 can detect whether it is a charge state or a discharge state depending on whether the voltage generated in the current sensing resistor 41 is positive or negative. Besides this, the charge from the alternator 15 can be detected by communication with the electronic control device 13.

3. Voltage Balancing Process Performed by Discharge Circuits 45

When detecting the charge from the alternator 15 on the basis of a detection value of the current sensing resistor 41, the control unit 70 performs a process of comparing the voltage of each secondary battery 31 measured by the voltage detecting unit 61 with the second voltage (3.5 V as an example). The second voltage is a determination value for determining whether or not to perform the voltage balancing process. The control unit 70 activates all discharge circuits 45 corresponding to secondary batteries 31 of which the voltages exceed the second voltage, and resistance-discharges the secondary batteries 31 of which the voltages exceed the second voltage.

Accordingly, the voltages of the respective secondary batteries 31 having high voltages are reduced, and the voltages of the secondary batteries 31 can be balanced. Furthermore, while the voltages are balanced, the charge is continued. Therefore, the voltages of the secondary batteries 31 rise while being balanced. When the total voltage of the assembled battery 30 reaches a target charge voltage (14.4 V as an example), information on this is transmitted from the battery 20 side to the electronic control device 13 on the vehicle side. Then, the alternator 15 stops the power generation in response to a command from the electronic control device 13, and the charge of the battery 20 is terminated. Then, the voltage balancing process is terminated in accordance with the termination of the charge.

In the present embodiment, the target charge voltage of the assembled battery 30 is 14.4 V, and the assembled battery 30 is composed of four secondary batteries 31 connected in series. Therefore, a voltage obtained by dividing the target charge voltage by four, which is the number of cells (the number of power storage devices), i.e., a voltage of a single cell into which the target charge voltage is converted, is 3.6 V. The term "cell" here means one secondary battery.

4. Charge Current Control

As described above, when the voltage of any of the secondary batteries 31 exceeds the second voltage (3.5 V as an example), the voltage balancing process is performed by the discharge circuits 45. Therefore, even if the voltage varies among the secondary batteries 31 at the start of charge, the variation in voltage can be suppressed during the charge.

Since the lithium-ion secondary batteries 31 have a sharp voltage curve at the end of charge as shown in FIG. 5, the voltage balancing performed by the discharge circuits 45 may not catch up with the voltage rise, and the voltage of a particular secondary battery 31 may rise. This raises a concern that the particular secondary battery 31 exceeds the upper limit voltage (4.0 V as an example) that is an application limit and results in overvoltage.

Accordingly, when the control unit 70 detects the charge on the basis of a detection value of the current sensing resistor 41, the control unit 70 performs the charge current control (FIG. 7) after the detection of the charge, thereby suppressing the voltage rise of the secondary batteries 31 and preventing the overvoltage of the secondary batteries 31.

After the start of the charge by the alternator 15, the voltage detecting unit 61 continuously measures the respective voltages of the secondary batteries 31 and the total voltage of the assembled battery 30 (S10).

The control unit 70 compares the measured voltages of the secondary batteries 31 and detects a highest voltage Vm (S20), and performs a process of comparing the highest voltage Vm of the secondary batteries 31 with the first voltage (S30). Incidentally, the first voltage is 3.7 V as an example, and is set to a numerical value between 3.6 V, i.e., the voltage obtained by dividing the target charge voltage of the assembled battery 30 by the number of cells, and 4.0 V, i.e., the upper limit voltage of the secondary batteries 31. The first voltage corresponds to a "threshold".

If the highest voltage Vm of the secondary batteries 31 is less than the first voltage (YES at S30), the control unit 70 controls the semiconductor switch Q1 to be kept in an on state through the driver 47 (S50).

In the present example, the switching frequency of the semiconductor switch Q1 is 100 Hz to several kHz, and the term "be kept in an on state" means that the semiconductor switch Q1 is kept in a state where the duty ratio is 100% for a time longer than the switching period of the semiconductor switch Q1 (for example, at least several periods or more).

That is, if the variation in voltage among the secondary batteries 31 is small and the highest voltage Vm of the secondary batteries 31 is less than the first voltage, the semiconductor switch Q1 is kept in an on state, and the charge of the battery 20 goes on in a state where the semiconductor switch Q1 is in a conducting state. Then, when the total voltage of the assembled battery 30 reaches the target charge voltage (14.4 V as an example), the alternator 15 stops the power generation, and the charge of the battery 20 is thereby terminated. With this, the charge current control is also terminated (YES at S80).

On the other hand, if the variation in voltage among the secondary batteries 31 is large and the highest voltage Vm of the secondary batteries 31 exceeds the first voltage during the charge (NO at S30), the control unit 70 performs a process of comparing the highest voltage Vm of the secondary batteries 31 with the upper limit voltage (S40).

If the highest voltage Vm of the secondary batteries 31 is less than the upper limit voltage (YES at S40), the control unit 70 controls, through the driver 47, the semiconductor switch Q1 to be brought out from the conducting state where the semiconductor switch Q1 is kept in an on state (a duty ratio Dy is 100%) and enter into a switching state where the semiconductor switch Q1 is alternately turned on and off with a predetermined period (S60). Hereinafter, controlling the semiconductor switch Q1 to enter into a switching state will be referred to as switching control.

When the semiconductor switch Q1 is switched to switching control, the charge current applied to the secondary batteries 31 is reduced. Specifically, in the present example, the duty ratio Dy of the semiconductor switch Q1 is set to 50%, and thus the charge current applied to the secondary batteries 31 is reduced to about 50% of that before the switching.

$$Dy=Ton/(Ton+Toff) \quad (1)$$

Ton denotes an on time of the semiconductor switch Q1, and Toff denotes an off time of the semiconductor switch Q1.

Therefore, the voltage rise of the secondary batteries 31 can be suppressed, and the rate of voltage rise of the secondary batteries 31 is reduced. Accordingly, the voltage balancing process performed by the discharge circuits 45 catches up with the voltage rise, and the variation in voltage among the secondary batteries 31 becomes small. Therefore, it is possible to perform the charge while suppressing the voltage of a particular secondary battery 31 from rising.

Then, when the total voltage of the assembled battery 30 has reached the target charge voltage (14.4 V as an example), the alternator 15 stops the power generation, and the charge of the battery 20 is thereby terminated. With this, the charge current control is also terminated (YES at S80).

If switching control of the semiconductor switch Q1 is performed to save the amount of charge, and yet the highest voltage Vm of the secondary batteries 31 exceeds the upper limit voltage (NO at S40), the control unit 70 controls the semiconductor switch Q1 to be kept in an off state through the driver 47 (S70).

Incidentally, the term "be kept in an off state" means that a state where the duty ratio is 0% is continued for a time longer than the switching period of the semiconductor switch Q1 (for example, at least several periods or more), and the semiconductor switch Q1 is in a cutoff state (a state where the path is open). Accordingly, the charge of the secondary batteries 31 is cut off, and thus it is possible to suppress the secondary batteries 31 from exceeding the upper limit voltage and resulting in overvoltage.

FIG. 8 shows a charge characteristic (T-V) of the assembled battery when charged at a predetermined rate, where the horizontal axis indicates time t, and the vertical axis indicates voltage V of the secondary battery (a single cell) 31. In an example of FIG. 8, at time t1, the voltage of the secondary battery 31 reaches the second voltage (3.5 V); at time t2, the voltage of the secondary battery 31 reaches the first voltage (3.7 V); and, at time t4, the voltage of the secondary battery 31 reaches the upper limit voltage (4.0 V).

Accordingly, in the example of FIG. 8, in a period T1 after time t1, the voltage balancing process is performed by the discharge circuit 45, and then, in a period T2 after time t2, the voltage balancing process by the discharge circuit 45 and the switching control of the semiconductor switch Q1 are performed in parallel.

In the present embodiment, the voltage obtained by dividing the target charge voltage of the assembled battery 30 by the number of cells, i.e., four, is "3.6 V". Furthermore, the first voltage as a benchmark for the initiation of the switching control is "3.7 V", and the second voltage as a benchmark for the initiation of the execution of the voltage balancing process is "3.5 V". That is, "the first voltage" and "the second voltage" are set to a value close to "the voltage obtained by dividing the target charge voltage of the assembled battery 30 by the number of cells (the number of power storage devices)".

Accordingly, at the end of charge when the voltage of the assembled battery 30 comes close to the target charge voltage, the switching control of the semiconductor switch Q1 is performed in parallel with the voltage balancing process by the discharge circuits 45. Therefore, at the end of charge, it is possible to suppress the voltage rise of a particular secondary battery 31 while suppressing the variation in voltage among the secondary batteries 31 constituting the assembled battery 30.

5. Description of Advantageous Effects

In the present embodiment, the battery can independently switch the charge current by switching the duty ratio Dy. Therefore, even if the alternator 15 mounted on the vehicle 1 does not acquire information on the voltages of the secondary batteries 31 from the battery 20 or regardless of the performance of the alternator 15, the battery 20 side can suppress a particular secondary battery 31 having high voltage from reaching the upper limit voltage, or can delay the particular secondary battery 31 having high voltage from reaching the upper limit voltage.

Furthermore, the voltage balancing process by the discharge circuit 45 and the switching control of the semiconductor switch Q1 are performed in parallel, and it is thereby possible to suppress the voltage rise of the secondary batteries 31 while suppressing the variation in voltage among the secondary batteries 31. Accordingly, it is possible to suppress a particular secondary battery 31 having high voltage from reaching the upper limit voltage, or to delay the particular secondary battery 31 having high voltage from reaching the upper limit voltage.

Moreover, in the present embodiment, when the highest voltage Vm of the secondary batteries 31 exceeds the upper limit voltage, the semiconductor switch Q1 is controlled to be kept in an off state, and therefore the charge current applied to the battery 20 is cut off. However, it is possible to perform the discharge through the parasitic diode 37, and, even after the charge of the battery 20 is cut off, electric power can be supplied from the battery 20 to the vehicle load 10.

Furthermore, since the iron-phosphate-based lithium-ion secondary batteries 31 have a sharp voltage curve at the end of charge, the voltage of a particular secondary battery 31 becomes high and may exceed the upper limit voltage if the variation in capacity is larger than assumed. In this regard, in the present embodiment, the switching control is performed in parallel with the voltage balancing process at the end of charge, and therefore, it is possible to suppress a particular secondary battery 31 from exceeding the upper limit voltage and resulting in overvoltage, or to delay the particular secondary battery 31 from reaching the upper limit voltage.

Moreover, the first voltage (3.7 V) is set to a numerical value between the voltage (3.6 V) obtained by dividing the target charge voltage of the assembled battery 30 by the number of cells and the upper limit voltage (4.0 V). Therefore, if the secondary batteries 31 are equal in voltage, the switching control is not performed, and the assembled battery 30 can be charged to the target charge voltage. That is, the assembled battery 30 can be charged without reducing the charge current, and therefore the charge speed is not reduced.

On the other hand, if the highest voltage Vm of the secondary batteries 31 exceeds the first voltage (3.7 V), the switching control is performed. After that, the voltage rise of the secondary batteries 31 is suppressed, so that it is possible to suppress a particular secondary battery 31 having high voltage from exceeding the upper limit voltage, or to delay the particular secondary battery 31 from reaching the upper limit voltage.

Embodiment 2

Subsequently, Embodiment 2 of the present invention will be described with FIG. 9.

In Embodiment 1, there is described an example in which during the switching control, the duty ratio of the semiconductor switch Q1 is 50% that is a fixed value. In Embodiment 2, the duty ratio Dy of the semiconductor switch Q1 is switched according to the highest voltage Vm of the secondary batteries 31.

Specifically, as shown in FIG. 9, when the highest voltage Vm of the secondary batteries 31 is 3.7 V to 3.8 V, the duty ratio Dy of the semiconductor switch Q1 is 50%; when the highest voltage Vm of the secondary batteries 31 is 3.8 V to 3.9 V, the duty ratio Dy of the semiconductor switch Q1 is 30%; and when the highest voltage Vm of the secondary batteries 31 is 3.9 V to 4.0 V, the duty ratio Dy of the semiconductor switch Q1 is 10%.

In this way, the duty ratio Dy of the semiconductor switch Q1 is switched to be smaller as the highest voltage Vm of the secondary batteries 31 becomes higher. Therefore, the amount of charge decreases as the highest voltage Vm of the secondary batteries 31 comes closer to the upper limit voltage. Accordingly, the rate of voltage rise is reduced, and the secondary batteries 31 are less likely to reach the upper limit voltage.

Embodiment 3

Figure 10:
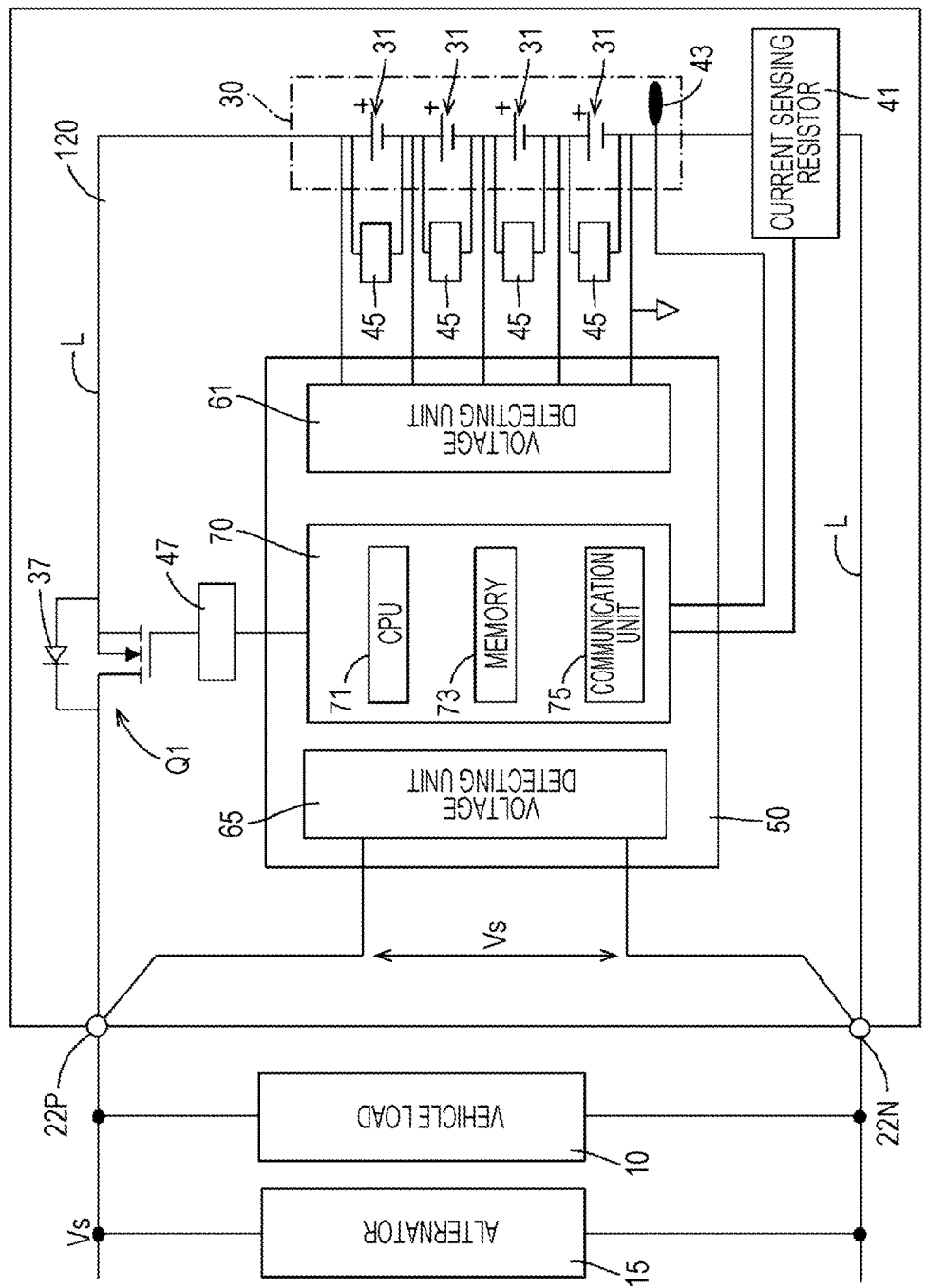
FIG. 10 is a circuit diagram of a battery applied in Embodiment 3.
Figure 11:
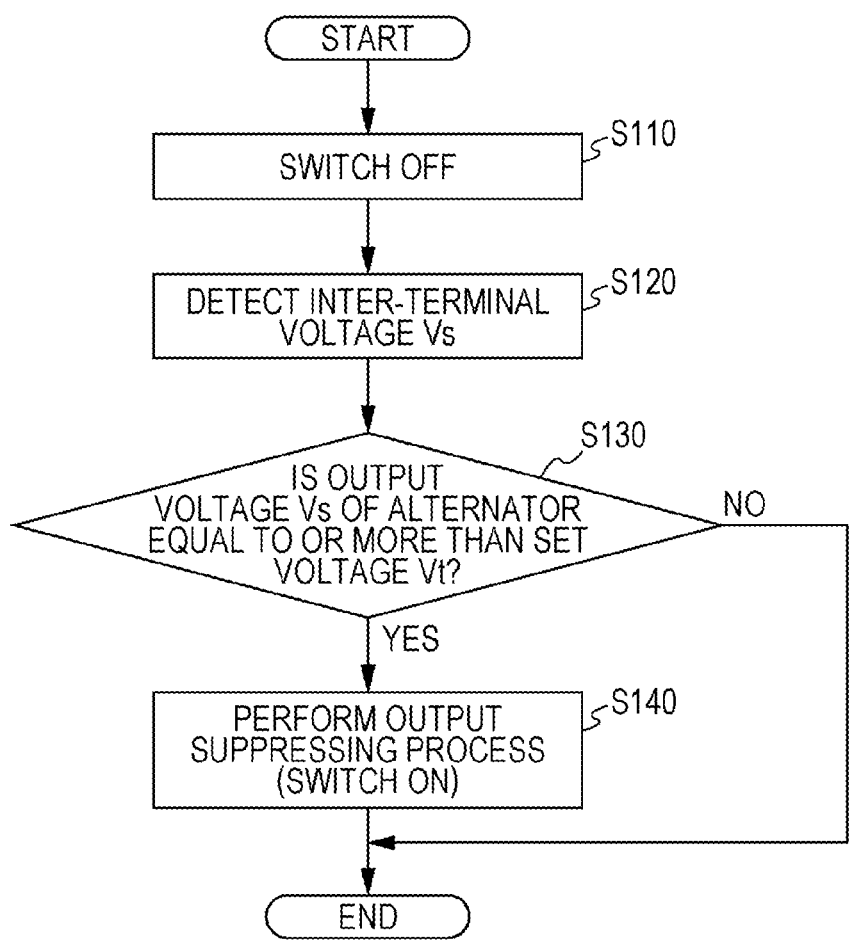
FIG. 11 is a flowchart showing the flow of an output suppressing process.

Subsequently, Embodiment 3 of the present invention will be described with FIGS. 10 to 12. FIG. 10 is a block diagram showing an electrical configuration of a battery 120 in Embodiment 3. FIG. 11 is a flowchart showing the flow of an output suppressing process.

In Embodiment 1, there is described an example in which when the highest voltage Vm of the secondary batteries 31 exceeds the first voltage (3.7 V as an example) during the charge, the semiconductor switch Q1 is switched from a conducting state to a switching state where the semiconductor switch Q1 is alternately turned on and off with a predetermined period.

If the semiconductor switch Q1 is switched to the switching control during the charge, while the semiconductor switch Q1 is turned off, the battery 20 is disconnected from the alternator 15. Accordingly, the load on the alternator 15 is reduced by a load from the battery, and therefore the output voltage tends to rise. By adjusting the field current flowing into a field coil (not shown) and the like, the alternator 15 is subjected to feedback control so that an output voltage stays constant.

However, if the response speed of the feedback control is slow, an output voltage Vs of the alternator 15 exceeds a set voltage Vt, which raises a concern that a high voltage is applied to another vehicle load (such as the electronic control device 13) connected to the alternator 15. Incidentally, the set voltage Vt is, for example, an upper limit of an appropriate range (an acceptable range) of the output voltage Vs of the alternator 15.

Accordingly, as shown in FIG. 10, the battery 120 in Embodiment 3 is provided with a voltage detecting unit 65 that measures an inter-terminal voltage Vs between the positive terminal 22P and the negative terminal 22N to detect the output voltage Vs of the alternator 15.

Then, if the inter-terminal voltage Vs exceeds a set voltage while the switching control is performed, the control unit 70 performs the output suppressing process for reducing the output voltage of the alternator 15.

Specifically, as shown in FIG. 11, when the control unit 70 turns the semiconductor switch Q1 off, the voltage detecting unit 65 measures the inter-terminal voltage Vs (S110, S120).

Then, the control unit 70 performs a process of comparing the output voltage Vs of the alternator 15 with the set voltage Vt (S130). If the output voltage Vs of the alternator 15 is equal to or more than the set voltage Vt, the control unit 70 switches the semiconductor switch Q1 from off to on (S140: the output suppressing process).

When the semiconductor switch Q1 is turned on, the alternator 15 and the battery 120 are in a conducting state, and the charge current flows from the alternator 15 into the battery 120. That is, a surplus of electric power generated by the alternator 15 is appropriated for the charge of the battery 120, and therefore the load on the alternator 15 is reduced, so that the output voltage Vs of the alternator 15 can be reduced. Accordingly, it is possible to suppress the application of high voltage to another vehicle load (such as the electronic control device 13) connected to the alternator 15. In the present embodiment, the output suppressing process is performed while the switching control of the semiconductor switch Q1 is performed.

Figure 12:
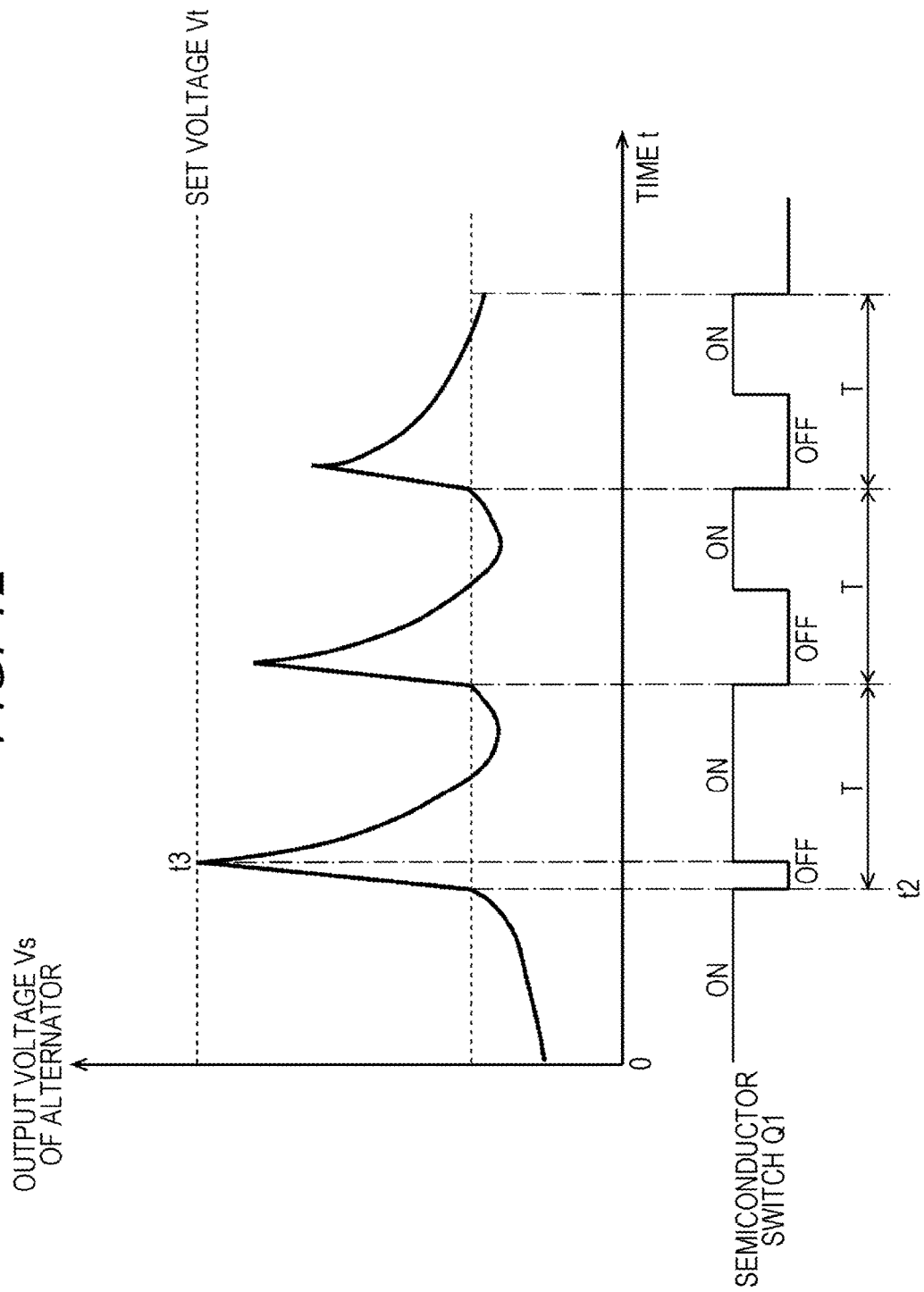
FIG. 12 is a graph showing the transition of an output voltage Vs of an alternator when the semiconductor switch is switched during charge.

FIG. 12 shows a waveform of the output voltage (the inter-terminal voltage) Vs of the alternator 15 when the semiconductor switch Q1 is switched from a conducting state where the semiconductor switch Q1 is kept in an on state to the switching control of turning the semiconductor switch Q1 alternately on and off with a predetermined period at time t2 because the highest voltage Vm of the secondary batteries 31 exceeds the first voltage during the charge.

As shown in FIG. 12, immediately after the semiconductor switch Q1 is switched to the switching control (immediately after time t2), the battery 120 is disconnected from the alternator 15, and thereby the output voltage Vs of the alternator 15 rises sharply, and then reaches the set voltage Vt at time t3.

Then, the control unit 70 switches the semiconductor switch Q1 from off to on, and therefore a surplus of electric power generated by the alternator 15 is appropriated for the charge of the battery 120, so that the load on the alternator 15 is reduced. Thus, the output voltage Vs of the alternator 15 can be reduced.

After that, the semiconductor switch Q1 is turned alternately on and off with a predetermined period T. Therefore, each time the semiconductor switch Q1 is switched from on to off, the output voltage Vs of the alternator 15 rises. However, the feedback control catches up with the voltage rise, and the peak of the output voltage Vs of the alternator 15 gradually comes down. In an example of FIG. 12, in the second and subsequent periods, the peak of the output voltage Vs of the alternator 15 is kept lower than the set voltage Vt. Therefore, in the second and subsequent periods, the semiconductor switch Q1 is switched at the duty ratio of 50%. The duty ratio is 50% or more only in the first period.

Other Embodiments

The present invention is not limited to the embodiments described above and the accompanying drawings. For example, the following embodiments are also included in the technical scope of the present invention.

(1) In Embodiment 1, there is described an example in which the battery 20 is mounted on a car. However, the use of the battery 20 is not limited to cars, and may be applied to, for example, motorcycles. Furthermore, the battery 20 may be used for other purposes, such as UPS. Moreover, a charger does not always have to be a vehicle generator, such as an alternator, and may be an off-vehicle dedicated charger.

(2) In Embodiment 1, the semiconductor switch Q1 is provided as an example of a switch. However, a relay may be used instead of the semiconductor switch Q1. Furthermore, even in the case of using a semiconductor switch, elements other than FET, such as a power transistor, may be used.

(3) In Embodiment 1, there is described an example in which the assembled battery 30 is composed of four iron-phosphate-based lithium-ion secondary batteries 31 connected in series. However, needless to say, the number of secondary batteries 31 connected may be other than four.

(4) In Embodiment 1, the iron-phosphate-based lithium-ion secondary batteries 31 are provided as an example of power storage devices. However, it can be also applied to, for example, a ternary lithium-ion secondary battery. Incidentally, the ternary lithium-ion secondary battery is a cell using lithium-containing metal oxide containing elements of Co, Mn, and Ni as positive-electrode active material and graphite or carbon as negative-electrode active material. Furthermore, the power storage devices may be other secondary batteries, such as a lead-acid battery, or a capacitor.

(5) In Embodiment 1, there is adopted a configuration in which the charge current applied to the secondary batteries 31 is switched by switching the semiconductor switch Q1 from a state in which the semiconductor switch Q1 is kept in an on state (the duty ratio is 100%) to the switching control (the duty ratio is 50%). Other than this, for example, as shown in FIG. 13, a step-down circuit may be provided in the battery to add a function of stepping down the charge voltage.

Figure 13:
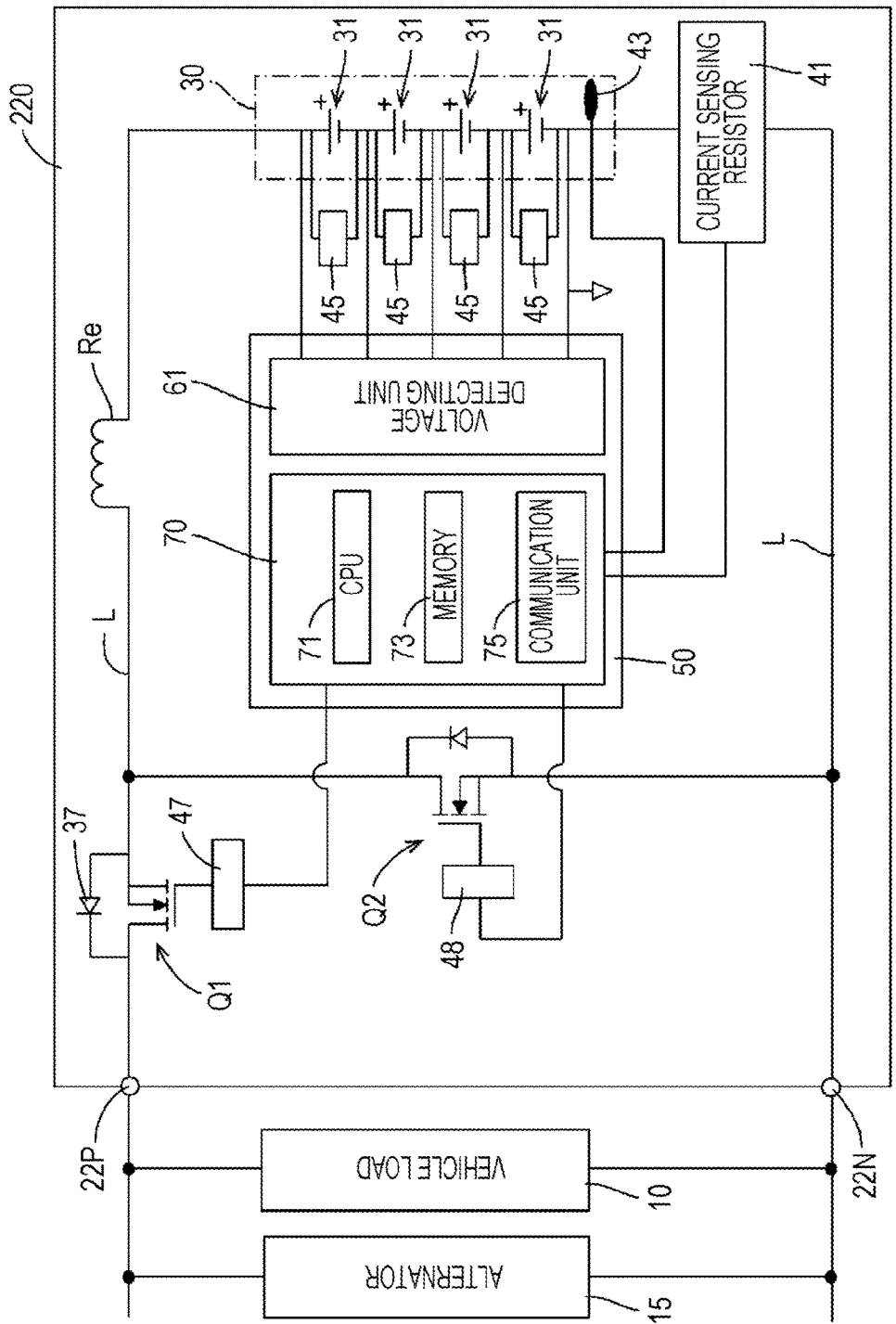
FIG. 13 is a circuit diagram of a battery in another embodiment.

A battery 220 shown in FIG. 13 includes a step-down circuit composed of a reactor Re and a semiconductor switch Q2. The reactor Re is connected to the semiconductor switch Q1 in series. One end of the reactor Re is connected to the source of the semiconductor switch Q1, and the other end is connected to the positive electrode of the assembled battery. Furthermore, the semiconductor switch Q2 is a field-effect transistor (FET). The source of the semiconductor switch Q2 is connected to the negative-electrode-side current-carrying path, and the drain is connected to an intermediate connection point between the semiconductor switch Q1 and the reactor Re. A driver 48 is connected to the gate of the semiconductor switch Q2. The semiconductor switch Q2 can be subjected to on/off control by a command transmitted from the control unit 70. The step-down circuit can step down the charge voltage by switching the semiconductor switch Q2, and can control the charge current by switching the semiconductor switch Q1.

(6) In Embodiment 1, there is described an example in which the voltage balancing process performed on the secondary batteries 31 by the discharge circuits 45 and the switching control of the semiconductor switch Q1 are performed in parallel at the end of charge. The voltage balancing process performed by the discharge circuits 45 is not indispensable, and only the switching control of the semiconductor switch Q1 can be performed. Also in this case, by performing the switching control, the charge current can be reduced on the battery side. Therefore, it is possible to delay the voltage rise of the secondary batteries 31, and it is possible to delay the time for the highest voltage Vm of the secondary batteries 31 to reach the upper limit voltage. Accordingly, the time for the battery 20 to cut off the charge from the alternator 15 can be secured long.

(7) In Embodiment 3, there is described an example in which the output suppressing process (FIG. 11: S40) is performed while the switching control is performed. The timing to perform the output suppressing process may be other than the timing while the switching control is performed as long as it is when the semiconductor switch Q1 is switched from on to off. For example, the output suppressing process may be performed when the semiconductor switch Q1 is switched from a state where the semiconductor switch Q1 is kept in an on state to an off state.

What is claimed is:

1. A power storage apparatus, comprising:
a plurality of power storage devices;
a switch provided on a current-carrying path to the plurality of power storage devices;
a voltage detecting unit that detects respective voltages of the power storage devices;
a control unit, wherein the control unit switches a duty ratio of the switch so as to prevent or delay the voltages of the power storage devices from reaching an upper limit voltage during charge;
an external terminal to which a charger is connected, the switch being disposed between the external terminal and the power storage devices; and
a case in which the power storage devices and the switch are contained, the case being provided with the external terminal.

2. The power storage apparatus according to claim 1, wherein, when a highest voltage of the plurality of power storage devices exceeds a threshold, the switch is controlled to enter into a switching state where the switch is alternately turned on and off with a predetermined period.

3. The power storage apparatus according to claim 1, wherein the control unit sets the duty ratio of the switch to be smaller as a highest voltage of the plurality of power storage devices is higher.

4. The power storage apparatus according to claim 1, wherein the threshold is a numerical value between the upper limit voltage and a voltage obtained by dividing a target charge voltage, which is a target charge value of a total voltage of the plurality of power storage devices, by a number of the power storage devices.

5. The power storage apparatus according to claim 1, further comprising a plurality of discharge circuits that are connected to the plurality of power storage devices in parallel, and discharge the plurality of power storage devices,
wherein, when a highest voltage of the plurality of power storage devices exceeds a threshold while the plurality of discharge circuits are in operation, the control unit controls the switch to enter into a switching state in parallel with a voltage balancing process performed by the plurality of discharge circuits.

6. The power storage apparatus according to claim 1, wherein the plurality of power storage devices comprise iron-phosphate-based lithium-ion secondary batteries.

7. The power storage apparatus according to claim 1, wherein the switch comprises a field-effect transistor including a parasitic diode of which a forward direction comprises a discharge direction.

8. The power storage apparatus according to claim 1, wherein, after the switch is turned off, when a voltage between external terminals of the power storage apparatus exceeds a set voltage, the control unit switches the switch from off to on to flow a charge current from a vehicle generator connected to the external terminals into the power storage apparatus, and performs an output suppressing process of reducing an output voltage of the vehicle generator.

9. A method for controlling a power storage apparatus, the method comprising:
switching a duty ratio of a switch provided on a current-carrying path to a plurality of power storage devices included in the power storage apparatus so as to prevent or delay voltages of the power storage devices from reaching an upper limit voltage during charge,
wherein the power storage apparatus comprises:
an external terminal to which a charger is connected, the switch being disposed between the external terminal and the power storage devices; and
a case in which the power storage devices and the switch are contained, the case being provided with the external terminal.

10. A vehicle comprising a power storage apparatus according to claim 1.

11. The vehicle according to claim 10, further comprising a vehicle generator connected to external terminals of the power storage apparatus,
wherein, when a voltage between the external terminals exceeds a set voltage in a state where the switch is turned off, the control unit of the power storage apparatus switches the switch from off to on to flow a charge current from the vehicle generator into the power storage apparatus, and performs an output suppressing process of reducing an output voltage of the vehicle generator.

12. The vehicle according to claim 11, wherein the control unit of the power storage apparatus performs the output suppressing process while performing switching control of controlling the switch to enter into a switching state where the switch is alternately turned on and off with a predetermined period.

13. The power storage apparatus according to claim 1, wherein the charger is located outside of the case.

14. The power storage apparatus according to claim 1, further comprising:
an inner lid attached on top of the case; and
a top lid attached on top of the inner lid,
wherein the switch is located between the inner lid and the top lid.

15. The power storage apparatus according to claim 1, further comprising:
a current sensing resistor arranged on a negative electrode side of the power storage devices.

16. The power storage apparatus according to claim 15, wherein the power storage devices, the current sensing resistor, and the switch are connected in series through a current-carrying path.

17. The method according to claim 9, wherein the charger is located outside of the case.

18. The method according to claim 9, wherein the power storage apparatus further comprises:
an inner lid attached on top of the case; and
a top lid attached on top of the inner lid,
wherein the switch is located between the inner lid and the top lid.

19. The method according to claim 9, wherein the power storage apparatus further comprises:
a current sensing resistor arranged on a negative electrode side of the power storage devices.

20. The method according to claim 19, wherein the power storage devices, the current sensing resistor, and the switch are connected in series through a current-carrying path.

* * * * *